UNITED STATES PATENT OFFICE.

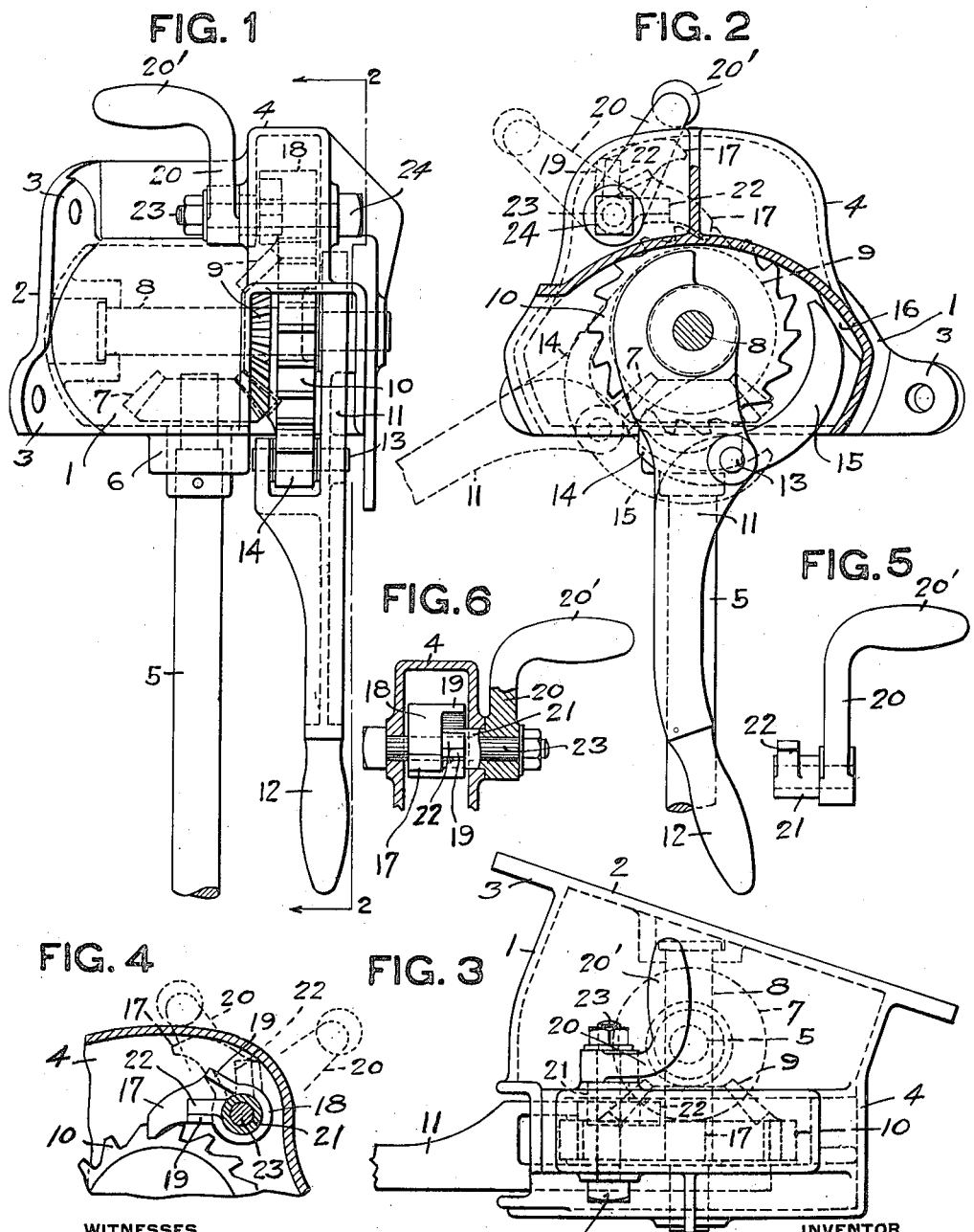

FRANKLIN T. REESE, OF PITTSBURGH, PENNSYLVANIA.

RATCHET MECHANISM.

1,318,462.   Specification of Letters Patent.   Patented Oct. 14, 1919.

Application filed October 31, 1914. Serial No. 869,559.

*To all whom it may concern:*

Be it known that I, FRANKLIN T. REESE, a citizen of the United States, and resident of Pittsburgh, in the county of Allegheny and State of Pennsylvania, have invented a new and useful Improvement in Ratchet Mechanism; and I do hereby declare the following to be a full, clear, and exact description thereof.

My invention relates primarily to car brakes, but it is to be understood that it may be applied also to operating the hopper doors of dump cars and the like.

One object of the invention is primarily to provide means for operating a hand brake on freight and passenger cars which secures for the operator the maximum amount of safety from injury in its operation. This applies particularly to the elimination of the pawl and ratchet from the floor of the car providing means for the operation of the hand brake lever vertically rather than by a rotary movement. In this device, if the brake chain should be broken when applying the brake, the operator is in position to thoroughly brace his body from accident through the parting of the brake chain. Further, the object is to provide a construction which will give the maximum amount of power by providing means through the lifting movement rather than by a rotary movement of the handle to apply the brake.

A further object of the invention is to provide a construction which is very compact and is entirely self-contained, and which may be secured practically as a whole upon the car body or other device with which it is used. A further object is to provide a construction of this character, the parts of which operate entirely by gravity so that no springs or other actuating means are required to cause the inter-engagement of the different parts thereof. A further object is to so construct the casing or frame of the device that the operating arm when actuated by an operator standing, for example, on the end sill of the car, will fully clear the operator as the operating arm is pulled toward him. With these and other objects in view, the invention consists in a construction and arrangement of parts, a preferred embodiment of which is illustrated in the accompanying drawing, in which Figure 1 is a side elevation of the brake mechanism and brake shaft; Fig. 2 is a sectional view on the line 2, Fig. 1; Fig. 3 is a plan view looking from above; Fig. 4 is a sectional detail looking from the rear of Fig. 2; Fig. 5 is a detail of the stop pawl lever, and Fig. 6 is a portion of the casing showing the pawl mechanism.

This brake construction is adapted for use particularly upon freight and passenger cars inasmuch as the operating parts are all arranged to lie flat and substantially parallel to the part of the car to which the brake is attached. The casing of the ratchet mechanism, furthermore, is arranged at an angle to the base plate thereof so that as the operator stands beside the mechanism and actuates the operating arm, the outer end of said arm will move in a path outside of the operator. This construction is especially advantageous where the brake mechanism is attached to the end of a freight car, and where the operator is compelled to stand on the narrow projection of the end sill to operate the same.

Referring to Fig. 3, which shows a plan view of the brake mechanism, the casing 1 is mounted on a base plate 2, the face of the latter being intended to lie flat against the face of the car. The base plate is provided with apertured lugs 3—3 by which the device may be secured in position. The outer portion 4 of the casing extends at an angle to the base plate, as viewed in plan, Fig. 3. The parts of the casing 1 and 4 form an inclosing hood, which thoroughly protects the operating mechanism of the brake from weather and from dirt, and especially protects these parts from being clogged with snow or ice. The actuating mechanism proper comprises the brake shaft 5, which may extend from the end sill or platform of the car in the usual manner, the outer end of this shaft having a bearing at 6 in the casing and having mounted on its upper end a gear wheel 7. Journaled in the casing at right angles to the shaft is a spindle 8 having fixed thereto a gear wheel 9 meshing with the gear wheel 7. The gear wheel 9 has formed, preferably integral, with it a ratchet wheel 10. Loosely pivoted on the spindle 8 is the ratchet operating arm 11, having the depending handle portion 12. Pivoted on the operating arm at 13 is a pawl 14 adapted to engage the teeth on the ratchet 10, and having a weighted tail piece 15, which when the parts are in operative position, over-balances the pawl end 14 to cause the same to engage the ratchet teeth when the operating arm 11 is being pulled to one side by the operator.

As viewed in Fig. 2, the operating arm is in operative or idle position and the pawl 14 is disengaged from the teeth of the ratchet 10. It will be seen that the inside of the casing is provided with a cam projection 16 over which the weighted end 15 of the pawl moves when the arm drops to inoperative position to hold the pawl 14 out of engagement with the ratchet 10. When the operating arm 11 is pulled to the left, as viewed in Fig. 2, the weighted end 15 of the pawl 14 rides from the cam projection 16, and by its weight throws the pawl end 14 into engagement with the ratchet wheel. A further movement of the operating arm thereafter will serve to turn ratchet wheel 10 and gear 9, which, meshing with gear 7, will rotate the brake shaft 5.

It will be seen from Fig. 3 that the spindle 8 of the ratchet wheel and actuating arm is at an angle to the base plate 2 of the casing. This permits the actuating part of lower arm when hanging down at rest as shown in Fig. 2, to lie substantially in a plane parallel to the shaft. When the operating arm is pulled to the left, however, to apply the brake, this angularity of the spindle 8 causes the operating arm to move out from the face of the car, thus providing ample space between the car face and the handle to clear the operator, who ordinarily stands alongside of the ratchet mechanism.

In order to hold the brake applied and at the same time to permit the operating arm to drop back into a position parallel to the car face and out of the way, I employ a locking pawl 17, which overlies and is adapted to engage the ratchet wheel 10. It is desirable at times to hold this locking pawl positively either in engaging or released position. This also is effected by gravity by means of the following described construction:—Referring to Fig. 4, it will be seen that the pawl 17 is provided at its pivoted end with a partial sleeve 18; the walls of this sleeve being extended as at 19—19, forming stop shoulders for a purpose hereafter described. The locking pawl operating lever 20 has a sleeve 21 at the outer end of which is an actuating lug 22 for the locking pawl. This pawl and lever are pivoted upon a pintle 23 mounted in the upper part of the casing 4 above and to one side of the ratchet wheel 10. The manner of assembling these parts is as follows: The pawl 17 is slipped up into the upper part of the casing with its sleeve portion 18 in alinement with the pintle apertures of the casing, which receives the pintle 23. The pintle is then slipped into position from the front of the casing, being stopped in proper position by its head 24. The sleeve 21 of the locking pawl lever 20 with its lug 22 is then slipped over the inner end of the pintle 23 and through a suitable keyhole shaped opening in back of the casing 14, bringing the lug 22 of the lever sleeve into a position between the extensions 19 of the pawl sleeve 18 as shown in rear view, Fig. 4. This lug 22 of the pawl actuating lever is placed at such an angle to the shank of the lever that when the lever with its weighted handle 21' is thrown to full line position to the right past the vertical as shown in Fig. 2, the weight of the lever arm and handle will hold the pawl 17 in engagement with the ratchet 10. When, on the other hand, the lever is thrown to the left past the vertical as shown in dotted line, Fig. 2, the weight of the lever will hold the pawl out of engagement with the ratchet wheel. Thus it will be seen that the locking pawl may be held positively both in locking and released position by gravity acting on the weighted lever 20.

It is apparent, therefore, that all of the parts of the mechanism are held either in or out of operative position, mainly by gravity and without the use of springs or other like agencies which would complicate the construction. It will be seen also that when the brake is applied, the operating arm 11 hangs vertically in idle position with its pawl 14 positively held disengaged from the ratchet wheel 10, and the locking pawl is held in engagement with the ratchet wheel by its weighted lever 20, which is at all times within easy reach of the operator to be released by simply swinging said lever 20 to the left, Fig. 2.

It will be seen, furthermore, that all of the actuating parts or gears, etc., of the device are fully protected from weather conditions and from dirt by the overhanging casing. This not only keeps the mechanism free of grit and dirt, but also prevents clogging thereof by snow or ice.

It is also apparent that while this mechanism is primarily intended as a brake operating mechanism, it is equally well adapted for the closing, opening, and locking of the hopper doors of dump cars and the like. In fact, the device is applicable to any purpose where it is desired to hold a shaft in locked or released position.

While I have described a particular embodiment of the invention, it is to be understood that the same may be altered in details of construction and in relative arrangement of parts within the scope of the appended claims.

What I claim is:

1. A device comprising a shaft mounted on suitable bearings and having a gear wheel fixed thereto, a second gear wheel journaled in a support adjacent said shaft and adapted to engage the first gear wheel, a ratchet wheel operating said second gear wheel, a loosely hanging operating arm pivoted adjacent said ratchet wheel and having a pawl mounted thereon adapted to be thrown by gravity into engagement with said ratchet wheel, an abutment adjacent said pawl adapted to hold the latter out of engagement with the ratchet wheel when the operating arm drops by gravity to depending inoperative position, said pawl and abutment being so arranged that when said operating arm is moved from inoperative position said pawl will ride free of said abutment and will automatically by gravity engage said ratchet to permit actuation of said shaft by said operating arm.

2. A device comprising a shaft, suitable bearings therefor, a gear wheel fixed on said shaft, a support or casing mounted adjacent to said shaft and having a gear wheel journaled thereon adapted to engage the first wheel, a ratchet wheel adapted to operate said second gear, a loosely hanging operating arm adapted to hang vertically and substantially parallel to the surface upon which support is mounted, a pawl on said arm, an abutment adjacent said pawl adapted to hold the same out of engagement with said ratchet wheel when the actuating arm hangs in inoperative position, said pawl being thrown automatically by gravity into engagement with the ratchet when the operating arm is moved to free the pawl from its abutment.

3. A device comprising a shaft, suitable bearings therefor, a gear fixed to said shaft, a second gear mounted in a support adjacent said shaft, a ratchet wheel adapted to actuate said second gear, a pawl and actuating arm adapted to operate said ratchet wheel, a locking pawl mounted on said support above said ratchet wheel and adapted to be held by gravity in engagement therewith, abutting shoulders on said pawl and an actuating lever for said pawl having a lug adapted to engage said abutting shoulders, the distance between said shoulders and the angle of said lug with respect to said lever being such that when said lever is thrown to one side of the vertical it will hold the pawl by gravity in engagement with said ratchet wheel, and when thrown to the opposite side of the vertical, it will hold the pawl by gravity out of engagement with said ratchet wheel.

4. A device comprising a shaft, suitable bearings therefor, a gear fixed thereto, a second gear journaled on a support adjacent said shaft, a ratchet wheel, operating arm and pawl adapted to actuate said second gear, a locking pawl journaled on said support having lugs on either side of its axis, an actuating lever having a lug extending from its axis adapted to engage said pawl lugs, the arrangement of said pawl lugs with respect to the engaging position of the pawl and the angle of the said lug with respect to said lever being such that when the lever is thrown to one side of the vertical, it will by its weight hold the pawl in engagement with said ratchet wheel, and when thrown to the opposite side of the vertical, will hold said locking pawl in released position.

In testimony whereof, I the said FRANKLIN T. REESE have hereunto set my hand.

FRANKLIN T. REESE.

Witnesses:
PETER DIETZ,
G. EDWARD GLASER.